UNITED STATES PATENT OFFICE.

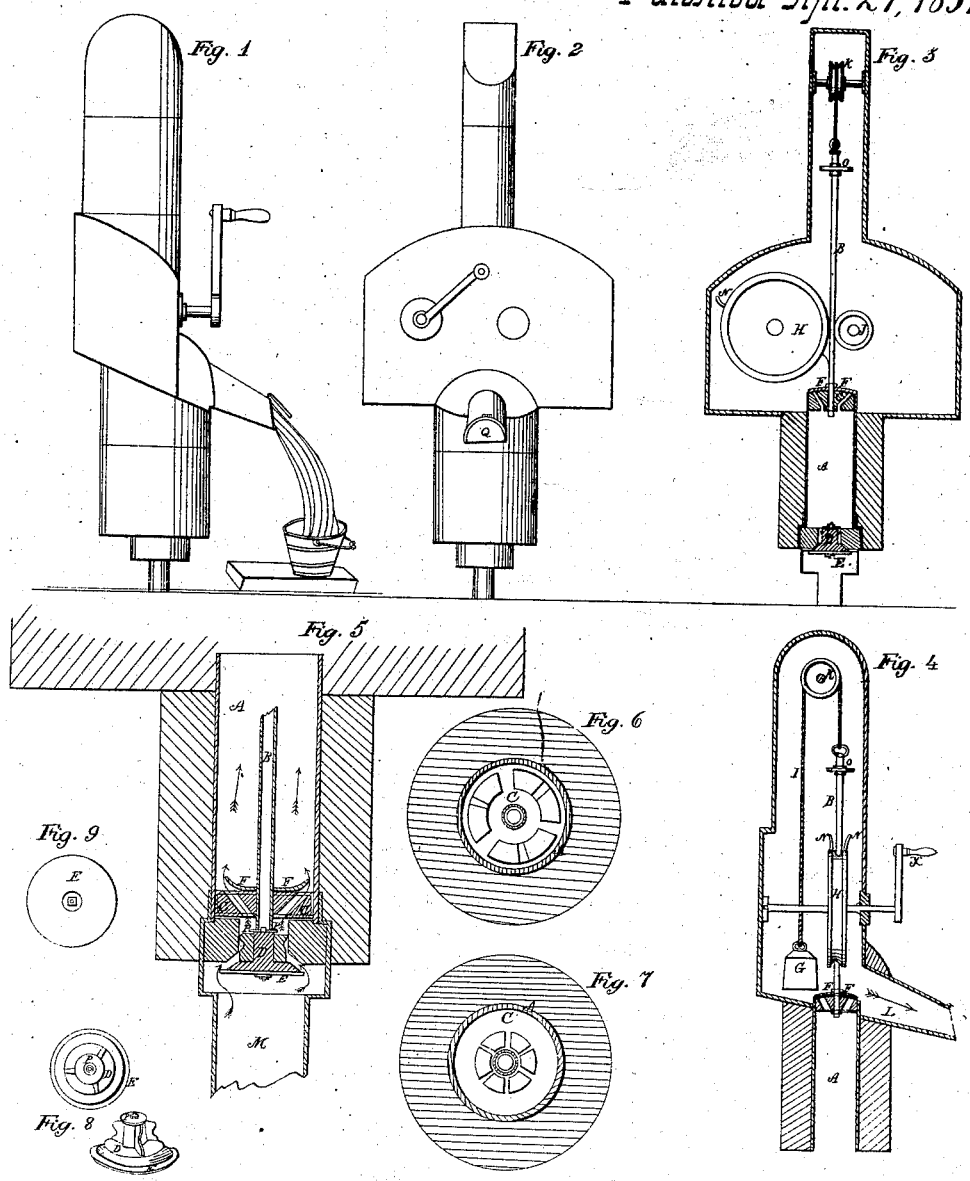
A. Hoagland,
Hydrant,
Nº 17,093.
Patented Apr. 21, 1857.

A. HOAGLAND, OF JERSEY CITY, NEW JERSEY.

HYDRANT.

Specification of Letters Patent No. 17,093, dated April 21, 1857.

*To all whom it may concern:*

Be it known that I, ABRAHAM HOAGLAND, of Jersey City, county of Hudson, and State of New Jersey, have invented a new and Improved Hydrant; and I hereby declare that the following is a full and exact description.

The nature of my invention consists in emptying the pipe of the water, (by drawing it out) to a depth below frost and keeping it closed to prevent the circulation of air.

To enable others to make and use my invention I proceed to describe its construction and operation, reference being had to one sheet of drawings hereunto annexed and making part of this specification.

The same letters refer to the same things in all the figures.

Figure 1, elevation of a side of the hydrant. Fig. 2 front elevation of the same. Fig. 3 section (vertical) from side to side. Fig. 4 section (vertical) from front to rear Fig. 5 enlarged section to show the valves. Fig. 6 transverse section to show the top of the piston, C. Fig. 7 transverse section to show the bottom of the piston, C. Fig. 8 views of the lower valve which connects with the water in the service pipe. Fig. 9 the bottom of the same, showing the extra flexible valve, E.

The purpose of this hydrant is to prevent the water from freezing in the pipes (as is the case with all those now in use) in very cold weather, and to prevent the waste of water. To effect these objects I set the hydrant deep enough in the ground to avoid frost and connect it at the bottom with the service pipe, M, Fig. 5, and have constructed my apparatus to bring up to the surface and instantly empty the water which is in the pipe A, of the hydrant. The pipe, A, (Fig. 5 enlarged) connects beneath frost, with the water pipe, M. It contains a piston, C, upon which there is a flexible valve, F. The rod, B, of this piston is made hollow to admit air from the top down through it to avoid a vacuum when the pipe, A, is emptied. The pipe reaches a little above the floor of the spout, L, so as to fill itself readily and leave no water to freeze. The water from the service pipe, M, is admitted from below, by means of the valve, D, which for this hydrant must be peculiarly constructed. The body of it, D, is in the usual form of a bevel winged valve. To this I add below an india rubber flexible valve, E, to overlap the body, and cover the line of junction between the valve, D, and its socket. This is essential as it is necessary for this hydrant that the valve should not leak. There is also at the top of the body, D, an india rubber cushion or washer, P, upon which the hollow rod, B, sits when it thrusts open the valve to admit the water and this cushion, P, prevents the water entering the hollow rod, B. This hollow rod, see Fig. 3, is held between two friction pulleys, H and J. The pulley, H, is on the shaft of the crank. Their use is to force down the piston, C, by their friction upon the rod, B. This friction is produced by any spring or weight acting against the journal box of the shaft of the pulley, J. It is graduated and arranged so as to be sufficient to lift the weight, G, and also overcome the small friction of the piston in the pipe, A. The weight, G, must be heavy enough to lift up the piston and empty the pipe.

In thrusting down the piston, C, the friction of the pulleys upon the rod, B, is sufficient for the purpose until it reaches the top of the valve, D, where a force will be needed equal to the pressure of the water on the valve. To produce this force I place on the rim of the wheel, H, two projections, N, set far enough apart to span and clear the pulley, J. These projections catch upon the cap or collar, O, and enable the operator by means of the crank to thrust down the piston with the force required to open the valve, D.

The piston, C, has a flexible valve, F, upon the top so that the water will force a passage up, but could not return. The water enters the piston at the bottom, Fig. 7, near the center, and issues from it by the valves, F, nearer to the outside of the piston—see Fig. 6.

To operate this hydrant the crank is turned, causing the pulley, H, to force down by friction the hollow rod, B, with its piston, to the bottom of the pipe, A. When it reaches the valve, D, a force is necessary to open the valve against the pressure of the water, therefore, the crank is turned till the projections, N, catch upon the collar or cap, and by a secure hold, and then the crank can force down the hollow rod and let the water flow into the pipe, A, and out at the spout, L. When sufficient is drawn the crank is loosed, and then the weight, G, draws up the piston with the water which is in the pipe, and empties out at the spout, L, the air to prevent a vacuum flows down the hollow rod, B. By all this arrangement no more water is drawn than is required, and when the crank is loosened the weight empties the pipe, and keeps it closed so that no circulation of air will aid to freeze any water that may remain at the bottom of the pipe, A, or that may leak in from the lower valve.

There is a hinged lip, Q, at the end of the spout, the object of which is to shut it up and prevent the air circulating within the hydrant. This cannot be opened so far but that it will close of itself after the water has ceased to run, the pipe, A, by which the water comes up, being at the same time kept closed by the piston.

What I claim as my invention and desire to secure by Letters Patent is.

1. The emptying the pipe, A, by a self-acting valved piston, C, with hollow rod, B, in the manner above described.

2. I claim the construction and use of the valve, D, made of an ordinary bevel winged valve with the flexible valve, E, added at the bottom and the cushion, P, added at the top for the purposes described.

3. The combination of the catch, N, upon the large friction pulley, H, with the collar, O, to enable the operator to force down by the crank, the piston upon the valve, D, and open it against pressure as above described.

A. HOAGLAND.

Witnesses:
 OWEN G. WARREN,
 GEO. H. BAILEY.